Figure 1:
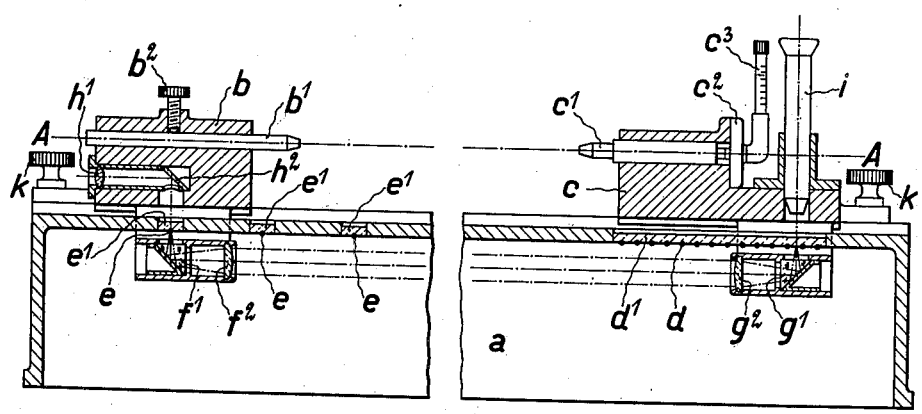

June 22, 1926.

O. EPPENSTEIN ET AL 1,589,796

MEASURING MACHINE

Filed Nov. 24, 1924

Inventors:
Otto Eppenstein
Adolf Keinle

Patented June 22, 1926.

1,589,796

UNITED STATES PATENT OFFICE.

OTTO EPPENSTEIN AND ADOLF STEINLE, OF JENA, GERMANY, ASSIGNOR TO THE FIRM OF CARL ZEISS, OF JENA, GERMANY.

MEASURING MACHINE.

Application filed November 24, 1924, Serial No. 752,050, and in Germany December 7, 1923.

The present invention relates to measuring machines which are constructed as so-called longitudinal-comparators and with which the length to be measured can therefore be directly read off on a scale. According to the present invention one provides these measuring machines with two scales successively disposed at a fixed distance and on which the position at any one time of the members, to be adjusted to the two extreme points of the length to be measured, is to be read off, and images by means of two collective optical systems, which are connected each to the one and the other of these two members, the one scale on the other, whereby the imaging systems are disposed in such a way that the focal points of the systems which lie on their sides facing the scales and lie on the latter themselves. The members to be adjusted to the extreme points of the length to be measured may either be the sighting marks of optical sighting devices or also material testing members, e. g. testing bolts. Thereby one of these members is generally rigidly connected to the appertaining system which serves for imaging the said scales, whilst the other is so connected to the appertaining imaging system as to be displaceable according to a minute scale relatively to the later in the direction of the measuring axis, i. e. that straight line into which during the measurement the length to be measured comes to lie. The new arrangement admits of measuring great lengths with comparatively simple means and in a simple manner. Thereby it is possible to subdivide the one scale comparatively coarsely, e. g. in lengths of 100 mm. and to only subdivide minutely the second scale of about the length of a section of the first scale, e. g. 100 mm. By then adjusting the one adjustable member by a displacement of its carrier in such a way that a division of the coarse scale comes to lie into the field of view of the optical system connected to the respective member, this division is imaged on the minute scale, whereby it serves as a pointer for this scale. Conversely, a part of the minute scale is, of course, imaged on the coarse scale, whereby the respective division again acts as the pointer. With the new arrangement the reading of both scales, even when measuring very great lengths, only takes place at a single place and could be done with the naked eye. Owing to the minute subdivision of the one of the two scales it is, of course, more suitable to use for this purpose a magnifying lens or a microscope which, however, will only serve as an observing but not as a sighting device.

The arrangement according to the present invention may also be made in such a way that the measurement up to magnitudes of the second order will be exempt from errors, which in the measuring machines of the present type generally arise owing to inaccuracies of the guides, in which the carriers of the members to be adjusted to the extreme points of the length to be measured are displaceable unless the measure is located into the measuring axis of the apparatus. With a view to attaining this freedom from errors in the machines of the present type, the optical systems by which the scales are imaged on each other are arranged in such a way that those points of their optical axes lie in the measuring axis, each of which points has the property that a luminous ray, aiming at it and the respective collective system and travelling in the plane determined by the optical axes of the systems and the measuring axis, emerges from the respective collective system at the same angle respecting size and sign relatively to the optical axis at which angle it is inclined to this axis when entering the system. With an imaging system only consisting of lenses, this property is due to the positive nodal points of the system. If to the lens system be also connected a reflector system, the positive nodal points of the lens system will only have the required property if the reflector system does not cause an inversion of the image in the plane coming into question. If, however, this be the case, the corresponding negative nodal points of the lens system are to be considered but these nodal points can then be also regarded, with respect to rays travelling in the plane in question, as positive nodal points of the whole system consisting of lenses and reflecting surfaces. By taking into consideration that a rotation of an imaging system about one of its positive nodal points does not impair the position of the image, provided the rotation keeps within certain limits, it may be seen that with the arrangement suggested in particular in the present case the rotations of the carriers, occurring owing to the almost unavoidable inaccuracies of the guide when displacing the carriers of the member to be adjusted to the extreme points of the length to be measured, do not have any detrimental effect upon the result of the measurement.

Figure 2:
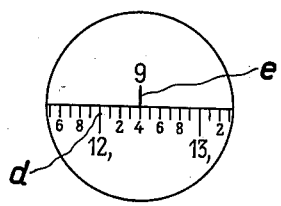

In the annexed drawing the subject of the invention is shown by a constructional example. Fig. 1 is a longitudinal section of a measuring machine according to the invention and Fig. 2 shows the field of view of a microscope connected to the machine.

The measuring machine has a bed $a$ on which two carriers $b$ and $c$ for two measuring bolts $b^1$ and $c^1$, which form the members to be adjusted to the extreme points of the length to be measured, are displaceably disposed. Of these bolts the one, $b^1$, is displaceably disposed in its carrier in the direction of its axis A—A, the measuring axis of the present machine, and it can be clamped by means of a screw $b^2$. The other of the bolts, $c^1$ is likewise displaceable in its carrier in the direction of its axis which coincides with the axis A—A, however, it is connected to a minute-measuring device which simultaneously serves for producing the measuring pressure and consists of a box $c^2$, filled with liquid, to which there is connected a small tube $c^3$, indicating the level of the liquid and thereby the position of the measuring bolt $c^1$ relatively to its carrier $c$. The bed $a$ is provided with two scales, of which the one $d$ having minute subdivisions is traced upon a glass plate $d^1$ fitted on the bed. The other scale consists of a number of divisions $e$ which are disposed at a comparatively great distance from each other, each of these divisions being traced on a glass strip $e^1$ fitted on the bed $a$. To the carrier $b$ is connected an optical system, consisting of an isosceles, rectangular prism $f^1$ and a collective lens $f^2$. To the carrier $c$ is connected an optical system, consisting of an isosceles, rectangular prism $g^1$ and an collective lens $g^2$. The focal length of the lens $f^2$ is equal to that of the lens $g^2$. Both systems together serve for imaging the divisions $e$ upon the scale $d$. Thereby the arrangement is such that the front focal plane of the collective lens $f^2$ and the rear focal plane of the collective lens $g^2$ coincide with the plane in which the divisions $d$ and $e$ lie, so that between both optical systems the ray pencils are travelling parallel to each other, hence the sharpness of the image of the divisions $e$ remains unaffected by a variation of the distance between the two measuring-bolt carriers $b$ and $c$. Moreover, with a view to being independent of the unavoidable rotations of the measuring-bolt carriers in the case of a displacement of the same, the arrangement has been made in such a way that the front negative nodal point of the collective lens $f^2$ and the rear negative nodal point of the collective lens $g^2$ lie in the axis A—A of the measuring bolts, i. e. the distance of the latter axis from the plane, in which the divisions $d$ and $e$ lie, is equal to the focal lengths of the lenses $f^2$ and $g^2$. For the illumination of the divisions serves a system connected to the carrier $b$ and consisting of a collective lens $h^1$ and a mirror $h^2$. For observing the scale $d$ and the divisions $e$ imaged on this scale there is provided a microscope $i$ which is fixed on the carrier $c$. Both measuring-bolt carriers can be clamped each on the bed $a$ by means of a screw $k$.

The measuring with the above described machine is carried out in the following manner. First of all the carriers $b$ and $c$ of the measuring bolts are adjusted in such a way that the divisions marked zero of the scales $d$ and $e$ approximately appear at the centre of the field of view of the microscope and their images coincide in the same. Thereupon, after loosening the screw $b^2$, the measuring bolt $b^1$ is so adjusted that it touches the bolt $c^1$ and the surface of the liquid in the small tube $c^3$ stands at the zero mark of the scale fitted to this tube, whereupon the bolt $b^1$ is again clamped. Now the two carriers $b$ and $c$ are separated and the body to be measured is brought between the two measuring bolts $b^1$ and $c^1$ in such a way that both measuring bolts touch the body. Thereby one adjusts the carriers $b$ and $c$ in such a way that a division $e$ again appears at the centre of the field of view of the microscope $i$ and the image of this division coincides with that of one of the divisions $d$. Thereupon the result of the measurement is read off in the microscope $i$ and on the tube $c^3$. If, e. g. the division marked 9 of the scale $e$ has been imaged into the field of view of the microscope and its image coincides with that of the division marked 12, 4 of the scale $d$, as shown in Fig. 2, if furthermore the surface of the liquid in the tube $c^3$ stands in the middle between the divisions marked 3 and 4 of the plus-side of the scale fitted to the tube $c^3$, the measure sought is 912,435 mm.

We claim:

1. In a measuring machine a bed, two straight-lined scales successively disposed and rigidly fixed on this bed, two members connected with this bed so as to be displaceable along the bed parallel to the said scales, these two members being adapted each to be adjusted to the one and the other extreme points of the length to be measured, two optical systems connected each to the one and the other of the said members, these optical systems being adapted to image the two scales upon each other, and each of the two optical systems having its focal point, facing the appertaining scale, in the scale.

2. In a measuring machine a bed, two straight-lined scales successively disposed and rigidly fixed on this bed, two members connected with this bed so as to be displaceable along the bed parallel to the said scales, these two members being adapted each to be adjusted to the one and the other extreme points of the length to be measured, two optical systems connected each to the one and the other of the said members, these optical systems being adapted to image the two scales upon each other, and each of the two optical systems having its focal point, facing the appertaining scale, in the scale, those points of the optical axes of the said optical systems lying in the straight line determined by the said extreme points, each of which has the property that a luminous ray, aiming at it and the respective system and travelling in the plane determined by the optical axes of the systems and the said straight line, emerges from the respective optical system at the same angle respecting size and sign relatively to the optical axis at which angle it is inclined to this axis when entering the system.

OTTO EPPENSTEIN.
ADOLF STEINLE.